Patent 2,699,543

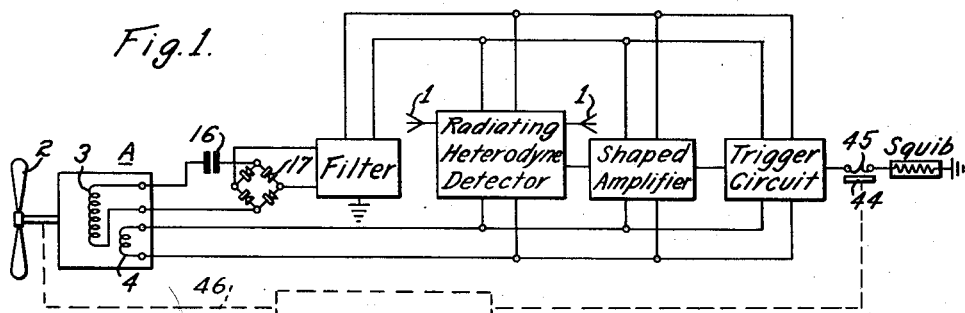

ELECTRICAL SYSTEM FOR AN ORDNANCE FUSE

Edward J. Naumann and Lloyd W. Clark, Baltimore, Md., assignors, by mesne assignments, to the United States of America as represented by the Secretary of the Navy Application June 4, 1945, Serial No. 597,574

3 Claims. (Cl. 343—7)

This invention relates generally to ordnance fuses and more particularly to ordnance fuses of the proximity type.

In certain of its aspects this invention is related to a copending application of E. J. Naumann, Serial No. 597,571, now Patent No. 2,687,095 filed on the same date as this application, entitled Electrically Operated Devices, to a copending application of R. N. Harmon and E. J. Naumann, Serial No. 597,573 now Patent No. 2,687,482, filed on the same date as this application, entitled Electrically Operated Devices, and to a copending application of Harold P. Allen, Serial No. 597,569, now Patent No. 2,682,047 filed on the same date as this application, and entitled Control Circuit, each application being assigned to the same assignee as this invention.

Proximity fuses are applied to various types of bombs, shells, torpedoes, etc., and usually have a small very compact radio transmitter built in to the fuse, which is generally attached to the nose of the projectile. The operation of this radio unit in most cases depends upon the Doppler effect but sometimes the result is obtained by photoelectric circuits or other means of electrical discharge or response when the fuse equipped projectile approaches its objective.

With all such electrically operated proximity fuses, an electrical power supply is required to energize the various components of the electronic system. In most cases these systems, in addition to various low-voltage supply sources, require a high-voltage plate supply for the tubes, usually of the order of say, 150 volts. Heretofore small batteries have furnished the required electrical power. These batteries have many disadvantages. In almost all fuses, the space is limited and it is essential that the power supply for these fuses occupy as little space as possible. For the most part, such batteries are bulky and must be made up in special cases to conform to certain design requirements. The power produced with respect to the size of the batteries must be very large and as a consequence, high efficiency batteries are needed. These have a relatively short life when stored. After a short storage period, their power may drop to such a low level as to render them useless in a proximity fuse. Batteries are further objectionable in that they are not dependable when exposed to low temperatures. Still further, with such battery energizing sources there is a constant danger that the fuse might be exploded inadvertently due to a short circuit or for some other reason, resulting in an electrical discharge into the heater, forming part of the squib, for the reason that the batteries throughout their life when once connected in the fuse circuits offer an ever present source of electrical energy.

As a consequence of the foregoing considerations, generators have been applied as the electrical energy sources in fuse systems. Systems of this type form the subject matter of the hereinbefore mentioned copending applications Serial Nos. 597,571, and 597,573. In general, these systems include a small alternator which has a permanent magnet rotor driven by a fluid operated device, such as a propeller or turbine which is operated by the air stream impinging on the propeller or turbine blades when the fuse equipped projectile is projected into the atmosphere. It will be apparent that a short time delay is inherent before the generator comes up to operating speed, due to such reasons as the inertia of the mechanical system, the magnetic drag on the generator rotor and the changing velocity of the air stream, to mention a few. During this period, the generator frequency and output are rising and, in the case of Doppler operated devices, may pass through the range of frequencies to which the radio control units are responsive. Unless adequate precautions are taken, detonation of the projectile may result.

One object of this invention is to provide a fuse for attachment to a projectile, which fuse is relatively safe.

Another object of this invention is to provide an electrically operated fuse powered by an alternator or other form of alternating-current generator, in which the maximum output of the generator is controlled.

Yet another object of this invention is to provide an ordnance fuse of the character mentioned in which suitable tuning of the alternator output is provided to cause the voltage curve thereof to reach a maximum point at a prearranged time in the flight of the fuse equipped projectile or to maintain a minimum point for a given time.

Other objects and advantages will become apparent from a study of the following disclosure when considered in conjunction with the accompanying drawing, in which:

Figure 1 is a block diagram setting forth the principles of this invention;

Figs. 2 and 3 are respectively cross-sectional and end views of a generator embodied in fuse systems of the class described; and Fig. 4 is a voltage-speed curve of the controlled generator output.

A fuse of the type which depends for its operation upon the Doppler effect is diagrammatically illustrated in Figure 1. Systems for the operation of such electronic fuses sometimes consist of a radiating heterodyne detector disposed in a circuit including the dipoles or antennae 1. The antennae 1 radiate energy to the target which, in turn, reflects the radiated energy back to the fuse. The reflected energy wave or signal which is received mixes with the direct or transmitted signal as in a heterodyne receiver. The reflected signal frequency is dependent upon the velocity of the fuse with respect to the target, as well as the direct signal frequency. The Doppler frequency equations relate the direct signal frequency to the reflected signal frequency, if the velocity between the signal source and the observer, or in this case, the receiver, is considered equal to twice the relative velocity between the fuse and the target. This condition substantially obtains because the receiver is mounted with the transmitter in the fuse and thus has the same relative movement with respect to the target as the signal source or transmitter. Therefore, the reflected signal, in most cases, differs in frequency from the direct signal. The reflected signal which is received, when mixed with the direct signal, produces a beat frequency signal which increases in amplitude as the fuse approaches the target. The beat signal is passed to the shaped amplifier which is adjusted to respond only to the limited range of frequencies of the Doppler effect. It is amplified in the amplifier and then passed to the trigger circuit where it is utilized, for example, to trigger a thyratron tube, which, when the beat signal amplitude is sufficient, becomes conducting and passes current through a heater in the squib resulting in ignition of the squib. The squib forms part of a powder train for igniting the main powder charge of the fuse equipped projectile.

The contact members 44 and 45 in the circuits between the trigger circuit and the squib include a stationary contact set which may, for example, be the set 45 and a movable set 44, the movable set being operated to engagement with the stationary set through a suitable mechanical connection with the propeller 2 indicated by the dotted line 46 and which preferably includes a gear reduction unit 47 shown only in block form. In general, the purpose of such a contact arrangement is to introduce a safety feature to the fuse by preventing arming of the fuse until the projectile is in motion through the surrounding fluid medium and at a safe distance from the point of launching, at which time the propeller drive, after a predetermined number of propeller revolutions, closes the contact assembly.

The generator or alternator generally designated A has two field windings in which are generated different voltages. The high-voltage winding 3 primarily provides the plate voltage supply while the low-voltage winding 4 primarily supplies the filament circuits of the system. Figs. 2 and 3 illustrate a specific type of generator which has been employed in fuses. It includes a stator assembly 5 and a permanent magnet cylindrical rotor 6, spot magnetized for six alternate north and south magnetic poles. The stator assembly includes a sheet metal punching of magnetic material having a transverse section 7 and three finger-like members 8 extending axially therefrom in equal circumferentially spaced relation. A second punching of a similar character having a transverse section 9 and the finger-like members 10 is disposed with the finger-like members extending in the same axial direction as those of the first-mentioned punching and in equal circumferentially spaced interlocking relation therewith. The fingers 10 are shorter than the fingers 8 and when disposed so that they terminate in the plane defined by the extremities of the fingers 8 provide a spacing of the transverse sections 7 and 9 which are securely joined in this position by the combination core section and bearing housing 11. The windings 3 and 4 are disposed about the core structure on a split tubular spacer 12 and a mounting plate 13 is secured against the transverse core section 7. The rotor 6 for the generator is nonmagnetically secured to a shaft 14 journalled in bearings in the extremities of the core section 11 such that it rotates in the pole circle formed by the fingers 8 and 10, and a propeller or turbine, shown only fragmentarily at 2, is threadedly secured to the shaft extension opposite the rotor.

If north rotor poles are under the fingers 8 and south rotor poles are under the fingers 10, a magnetic flux will flow from the rotor across the air gaps between the rotor and stator to the fingers 8, thence through the fingers 8 and integral transverse section 7 to the core section 11, through which the flux then passes to the transverse section 9 and integral fingers 11 where the path is completed across the rotor stator air gaps to the rotor south poles. As the rotor moves in rotation, the rotor poles reverse position under the fingers and the flux thrugh the stator reverses. This arrangement results in one alternation for each 30 mechanical degrees of rotor movement. Therefore an alternating magnetic flux results in the magnetic circuit and the alternating magnetic flux in the core section 11 induces voltages in the coils 3 and 4 linked therewith. Some control of generator output is obtained to give a flat characteristic above certain operating speeds by designing the generator to have a high-leakage reactance or by operating the magnetic circuits at saturation above certain speeds.

Better regulation is obtained, however, by providing a tuned circuit, preferably in conjunction with the main field winding 3 which involves a capacitor 16 in series with the output of the main winding of the generator. By properly selecting the value of the capacitor such that the inductive (winding 3) and capacitive reactive (capacitor 16) components in the circuit are equal at a predetermined frequency at which point circuit resonance occurs, it is possible to obtain the flat voltage characteristic with changing speeds of the alternator.

In ordnance operation, it is possible to know the speed at any point in the trajectory of a projectile. When the speed of the projectile is known, it is possible to calculate the propeller R. P. M. and hence find the alternator R. P. M. When the alternator R. P. M. is known, the frequency of the alternating current supplied to the rectifier 17 may be calculated. Thus the capacitor may be selected for resonance at any point and, depending upon the resistance load of the associated rectifier filter and electronic circuits, may have a fairly flat response over a reasonably wide range of operating speeds of the alternator. At resonance the series circuit currents will be high and as a consequence, the voltage of the generator main winding a maximum.

The operating speed range of a generator, such as illustrated in the drawings, may be, by way of example, from 20,000 to 40,000 revolutions per minute which for a six-pole machine produces an alternating voltage having a frequency range of roughly from 1,000 to 2,000 cycles per second. The beat signal frequency produced by the Doppler effect may be of the order of 285 to 450 cycles per second. To obviate application of an operating voltage to the electronic system over the beat signal frequency range, the capacitor 16 is selected of such a value that substantial resonance over the frequency range of 1,000 to 2,000 cycles per second occurs. Below these frequencies the generator voltage will be small as illustrated in Fig. 4. Hence, the amplifier circuits are inactive and response to the generator signal over the Doppler frequency range is obviated. Once resonance is reached or approached at the 1,000 cycle per second frequency a pronounced knee in the voltage-speed curve is formed and which for all practical purposes remains flat over the operating range of speeds. The arming circuits involving the contacts 44 and 45 may now close without danger of detonation of the projectile since the amplifier unit is insensitive to signals of the frequency produced by the generator over its operating range.

The foregoing disclosure and the showings made in the drawing are merely illustrative of the principles of this invention and are not to be interpreted in a limiting sense.

We claim as our invention:

1. An electrical system for an ordnance fuse comprising, in combination, an electrical signal transmitting and receiving system adapted for transmitting a high frequency signal to an object, receiving the signal reflected from said object and thereafter mixing the transmitted and reflected signals to produce a beat signal, an alternating-current generator for energizing the electrical signal transmitting and receiving system having an electrical output the frequency of which passes through the range of frequencies of the beat signal, circuit means connecting said generator to energize said electrical signal transmitting and receiving system including a series connected capacitor adapted to produce a condition of circuit resonance at generator frequencies above the beat signal frequency range, and means responsive to said beat signal.

2. An electrical system for an ordnance fuse comprising, in combination, an electrical signal transmitting and receiving system adapted for transmitting a high frequency signal to an object, receiving the signal reflected from said object and thereafter mixing the transmitted and reflected signals to produce a beat signal, an alternating-current generator for energizing the electrical signal transmitting and receiving system the electrical output of which passes through the range of frequencies of the beat signal, said generator having a pair of inductively related windings, one a high-voltage winding and the other a low-voltage winding, circuit means connecting said windings to said electrical signal transmitting and receiving system including a capacitor connected in series circuit with said high-voltage winding adapted to produce a condition of circuit resonance at generated frequencies above the beat signal frequency range, and means responsive to said beat signal.

3. An electrical system for an ordnance fuse comprising, in combination, an electrical system adapted to transmit electrical signals, to pick up the transmitted signals which are reflected from surrounding objects and mix the transmitted and reflected signals to produce a beat signal having a frequency of about 285 to 400 cycles per second, an alternating-current generator having a high voltage winding and a low voltage winding, a propeller operated device connected to said generator to drive said generator, said propeller operated device being operated by the relative wind and having a speed which varies depending upon the speed of the fuse through the air to correspondingly drive said generator over a wide speed range, the frequency of the electrical output of said generator upon acceleration thereof by said propeller, passing through the beat signal range of 285 to 400 cycles per second, circuit means connecting each of the high voltage and low voltage windings to said electrical system to energize said system, means for rectifying the electrical output of said high voltage winding, a capacitor connected in series with said high voltage winding and said rectifying means to form a tuned circuit in conjunction with said high voltage winding having a minmum frequency for resonance beginning above said beat signal frequency range, and means responsive to the magnitude of said beat signal.

References Cited in the file of this patent

UNITED STATES PATENTS

| Number | Name | Date |
| --- | --- | --- |
| 1,802,563 | Kuhn | Apr. 28, 1931 |
| 1,998,321 | Kaar | Apr. 16, 1935 |
| 2,022,517 | Patterson | Nov. 26, 1935 |
| 2,186,847 | Trogner | Jan. 9, 1940 |
| 2,218,859 | Schweitzer | Oct. 22, 1940 |
| 2,227,978 | Moore | Jan. 7, 1941 |
| 2,259,982 | Alexanderson | Oct. 21, 1941 |
| 2,424,193 | Rost et al. | July 15, 1947 |

FOREIGN PATENTS

| 718,483 | France | Nov. 4, 1931 |